United States Patent
Kim et al.

(10) Patent No.: US 11,688,897 B2
(45) Date of Patent: Jun. 27, 2023

(54) BATTERY APPARATUS AND METHOD FOR DETECTING THERMAL RUNAWAY OF VEHICLE BATTERY

(71) Applicant: HYUNDAI MOBIS Co., Ltd., Seoul (KR)

(72) Inventors: Sang Woo Kim, Yongin-si (KR); Jin Kwon Bae, Yongin-si (KR)

(73) Assignee: HYUNDAI MOBIS Co., Ltd., Seoul (KR)

( * ) Notice: Subject to any disclaimer, the term of this patent is extended or adjusted under 35 U.S.C. 154(b) by 41 days.

(21) Appl. No.: 17/381,766

(22) Filed: Jul. 21, 2021

(65) Prior Publication Data

US 2022/0029216 A1  Jan. 27, 2022

(30) Foreign Application Priority Data

Jul. 21, 2020 (KR) .................. 10-2020-0090552

(51) Int. Cl.
| | |
|---|---|
| *H01M 10/48* | (2006.01) |
| *H01M 50/204* | (2021.01) |
| *H01M 50/249* | (2021.01) |
| *H01M 10/613* | (2014.01) |
| *H01M 10/625* | (2014.01) |

(52) U.S. Cl.
CPC ....... *H01M 10/488* (2013.01); *H01M 10/486* (2013.01); *H01M 10/613* (2015.04); *H01M 10/625* (2015.04); *H01M 50/204* (2021.01); *H01M 50/249* (2021.01); *H01M 2200/10* (2013.01); *H01M 2220/20* (2013.01)

(58) Field of Classification Search
CPC .... H01M 50/30; H01M 50/35; H01M 50/358; H01M 50/367; H01M 50/375; H01M 50/211; H01M 50/20; H01M 50/249; H01M 50/143; H01M 50/394; B60I 50/64
See application file for complete search history.

(56) References Cited

U.S. PATENT DOCUMENTS

2020/0112016 A1* 4/2020 Erhart .................. H01M 50/209

* cited by examiner

*Primary Examiner* — Niki Bakhtiari
*Assistant Examiner* — Bartholomew A Hornsby
(74) *Attorney, Agent, or Firm* — Morgan, Lewis & Bockius LLP

(57) ABSTRACT

A battery apparatus for a vehicle of the present disclosure includes a battery module including a plurality of battery cells having a battery cell, a surface of which includes powder coated thereon, a cooling path which is positioned under the battery module and into which a gas generated from the powder is introduced when the surface of the batter cell reaches a specific temperature, an outlet duct which is connected to the cooling path and discharges the gas introduced from the cooling path to an outside through an outlet port, a gas sensor which is installed in the outlet duct and detects the gas introduced into the outlet duct to generate a gas detection result, a vehicle controller which receives the gas detection result and processes the gas detection result into information indicating a possibility of thermal runaway of the battery cell, and a peripheral device which receives the processed information and outputs the possibility of the thermal runaway of the battery cell as visual information or auditory information.

6 Claims, 3 Drawing Sheets

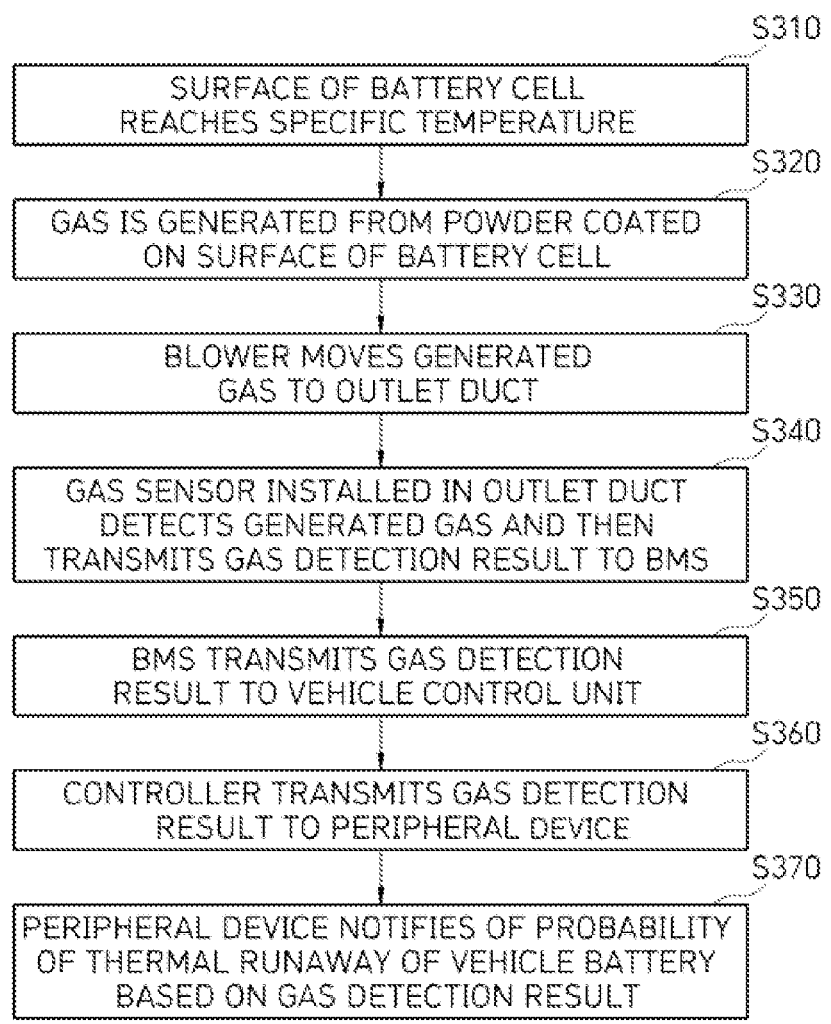

BATTERY APPARATUS AND METHOD FOR DETECTING THERMAL RUNAWAY OF VEHICLE BATTERY

CROSS-REFERENCE TO RELATED APPLICATION

This application claims priority to and the benefit of Korean Patent Application No. 10-2020-0090552, filed on Jul. 21, 2020, the disclosure of which is incorporated herein by reference in its entirety.

BACKGROUND

1. Technical Field

The present disclosure relates to a technique for detecting thermal runaway of a battery cell mounted in a vehicle.

2. Discussion of Related Art

As an interest in electric vehicles using electric energy of a vehicle battery increases, the number of countries that have established or are preparing a mandatory standard for a safety test of vehicle batteries is gradually increasing. As a mandatory standard for a safety test of vehicle batteries, a global technical regulation (GTR) standard, a GB standard, and the like are representative examples.

The GTR standard is a standard that is being established for the purpose of unifying vehicle standards around the world, and the GB standard is a standard that should be certified for start-up sales in China, wherein the term "GB" is an initialism for a Chinese word meaning "standard" in pinyin.

Meanwhile, in relation to the safety test of vehicle batteries, the corresponding standards stipulate a cell thermal runaway test. Here, thermal runaway is a phenomenon in which a battery cell causes gas, ignition, or explosion due to a short circuit occurring within the battery cell. The cell thermal runaway test is applied in one step in the GTR standard and has been scheduled to be applied around July 2020 in the GB standard.

In accordance with attempts to establish such a thermal runaway test as a standard, each automobile manufacturer is conducting research on a technique for detecting thermal runaway of a vehicle battery.

Most techniques reported so far relate to methods of delaying thermal runaway after the thermal runaway has occurred, and research on methods of detecting and blocking thermal runaway in advance before the thermal runaway occurs is insufficient.

Recently, a technique has been reported in which a temperature sensor is installed in each cell to monitor a temperature value of each cell measured by the temperature sensor and detect occurrence of thermal runaway in advance. However, since the temperature sensor should be installed in each cell, there are problems such as an increase in installation cost of the temperature sensor, an increase in size of a battery housing according to the installation of a sensor wire connected to the temperature sensor, and an increase in cost of a battery system due to the battery housing and the sensor wire.

SUMMARY

The present disclosure is directed to providing a detection apparatus for a vehicle battery and a method therefor, which are cable of detecting thermal runaway of a battery cell at a minimal cost in advance before occurrence of the thermal runaway.

The above objects and other objects, advantages and features of the present disclosure and methods for accomplishing the same will be more clearly understood from embodiments to be described in detail below with reference to the accompanying drawings.

According to an aspect of the present disclosure, a battery apparatus for a vehicle includes a battery module including a plurality of battery cells having a battery cell, a surface of which includes powder coated thereon, a cooling path which is positioned under the battery module and into which a gas generated from the powder is introduced when the surface of the battery cell reaches a specific temperature, an outlet duct which is connected to the cooling path and discharges the gas introduced from the cooling path to an outside through an outlet port, a gas sensor which is installed in the outlet duct and detects the gas introduced into the outlet duct to generate a gas detection result, a vehicle controller which receives the gas detection result and processes the gas detection result into information indicating a possibility of thermal runaway of the battery cell, and a peripheral device which receives the processed information and outputs the possibility of the thermal runaway of the battery cell as visual information or auditory information.

According to another aspect of the present disclosure, a method of detecting thermal runaway of a vehicle battery including a plurality of battery cells includes, when a surface temperature of a surface of a battery cell of the plurality of battery cells reaches a specific temperature, introducing a gas, which is generated from powder coated on the surface of the battery cell, into an outlet duct through a cooling path disposed under the plurality of battery cells, transmitting, by a gas sensor installed in the outlet duct, a gas detection result, which is obtained by detecting the gas introduced into the outlet duct, to a vehicle controller, processing, by the vehicle controller, the gas detection result into information indicating a possibility of thermal runaway of the battery cell to transmit the processed information to a peripheral device connected to an in-vehicle communication bus, and receiving, by the peripheral device, the processed information to output the possibility of the thermal runaway of the battery cell as visual information or auditory information.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which:

FIG. 3 is a flowchart illustrating a method of detecting thermal runaway of a vehicle battery according to an embodiment of the present disclosure.

DETAILED DESCRIPTION OF EXEMPLARY EMBODIMENTS

Figure 1:
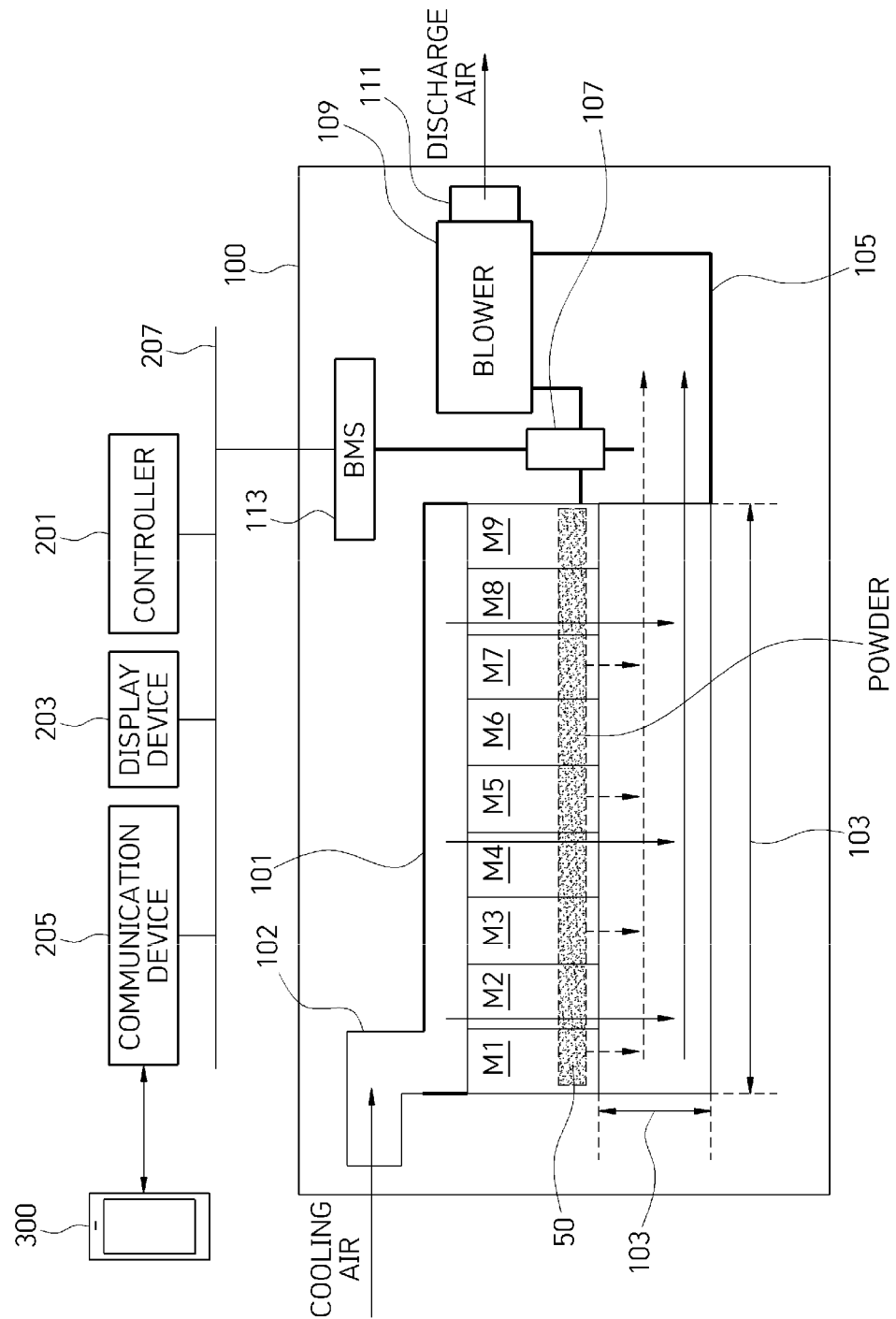
FIG. 1 is an overall block diagram of a battery apparatus for detecting thermal runaway of a vehicle battery according to an embodiment of the present disclosure.

Embodiments of the present disclosure are provided to describe the present disclosure more completely to those having ordinary skill in the art, and the following embodiments may be modified in various different forms. Therefore, the scope of the present disclosure is not limited to the following embodiments. Rather, these embodiments are provided so that this disclosure will be thorough and complete and will convey the concept of the present disclosure to those skilled in the art. Also, the thickness or size of each component in the drawings is exaggerated for convenience of description and clarity, and the same reference numerals denote the same elements in the drawings. As used herein, the term "and/or" includes any and all combinations of one or more of the associated listed items.

The terminology used herein is for the purpose of describing particular embodiments only and is not intended to limit the present disclosure As used herein, the singular forms "a" and "an" are intended to include the plural forms as well, unless the context clearly indicates otherwise. It will be further understood that the terms "comprises" and/or "comprising" used herein specify the presence of stated shapes, numbers, steps, operations, members, elements, and/or groups thereof but do not preclude the presence or addition of one or more other shapes, numbers, steps, operations, members, elements, and/or groups thereof.

The present disclosure is characterized in that, in order to prevent explosion and fire due to thermal runaway of a battery cell, before occurrence of the thermal runaway of the battery cell, the thermal runaway of the battery cell is detected in advance and a driver or a passenger in a vehicle is notified of the detected information.

In order to detect the thermal runaway of the battery cell in advance before the occurrence of the thermal runaway of the battery cell, the present disclosure is characterized in that a specific powder vaporized at a specific temperature is coated on a surface of the battery cell instead of a temperature sensor. Such a coating process is performed during cell or module assembly.

The specific powder coated on a cell surface may be made of a material having a characteristic of vaporizing when a surface temperature of the cell reaches the specific temperature. For example, the specific powder may vaporize at a temperature of 100° C. of the cell surface.

The temperature of 100° C. is not a temperature at which the battery cell explodes but may be a value set as a temperature at which an abnormality sign of the battery cell is expected. For reference, a normal operating temperature of a battery cell is a temperature of −35° C. to 60° C., and a temperature at which thermal runaway occurs is a temperature of about 300° C. of a cell surface.

A gas vaporized from the powder is sensed by a gas sensor installed in an outlet duct, and a detection result is transmitted to a battery management system (BMS).

The BMS transmits the detection result to a controller in the vehicle, the controller processes the detection result and transmits the processed detection result to a display device in the vehicle, and the display device provides an evacuation alarm notification to the driver or the passenger in the form of visual information.

Hereinafter, a battery apparatus for detecting thermal runaway of a vehicle battery according to an embodiment of the present disclosure will be described in detail with reference to the accompanying drawings.

Figure 2:
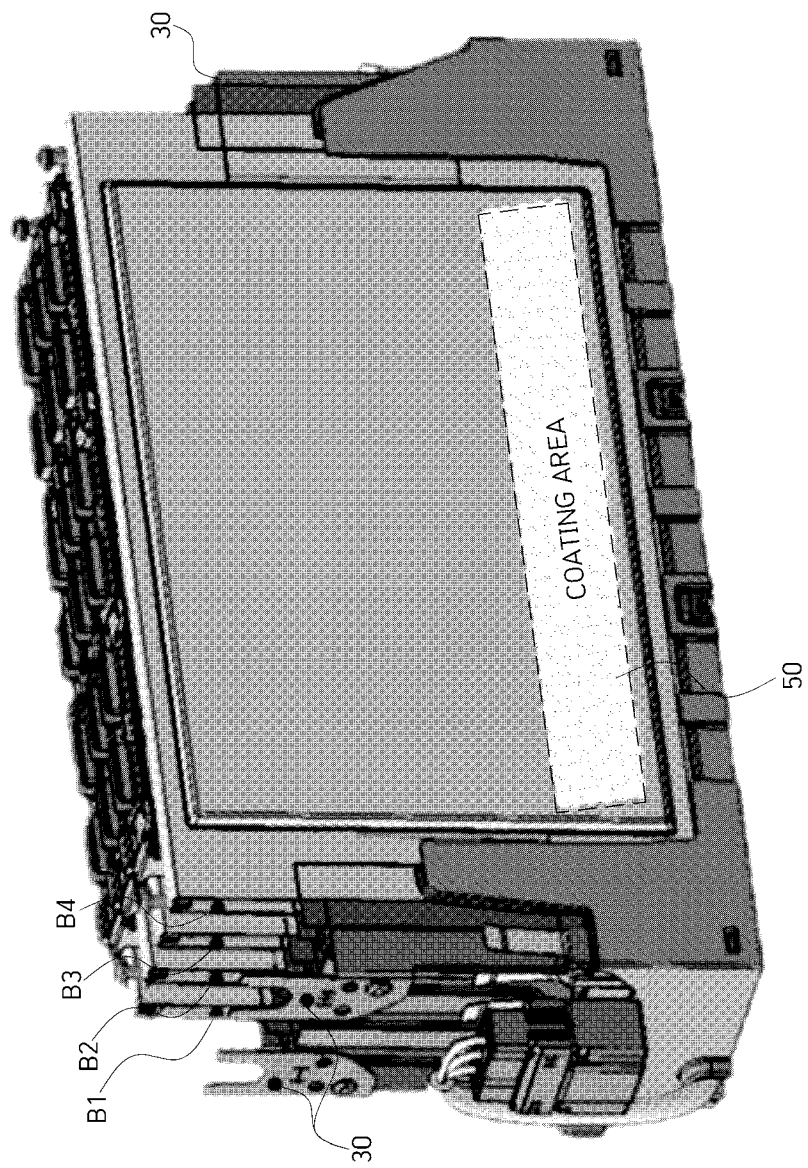
FIG. 2 is a perspective view of one battery module shown in FIG. 1.

FIG. 1 is an overall block diagram of a battery apparatus for detecting thermal runaway of a vehicle battery according to an embodiment of the present disclosure, and FIG. 2 is a perspective view of one battery module shown in FIG. 1.

Referring to FIG. 1, a battery apparatus 100 is installed in a vehicle. For example, the battery apparatus 100 may be installed, for example, under a rear seat.

The battery apparatus 100 is for detecting thermal runaway of a battery cell before occurrence of the thermal runaway and includes a plurality of battery modules M1 to M9, an inlet duct 101, a cooling path 103, an outlet duct 105, a gas sensor 107, a blower 109, an outlet port 111, and a BMS 113.

In addition, in order to notify a driver or a passenger of an expected thermal runaway result detected before the occurrence of the thermal runaway of the battery cell, the battery apparatus 100 performs communication with a vehicle controller 201, a display device 203, and a communication device 205 through an in-vehicle communication bus 207. Here, the in-vehicle communication bus may be a controller area network (CAN) communication bus, a local interconnect network (LIN) bus, a FlexRay bus, or an Ethernet bus for a vehicle.

The plurality of battery modules M1 to M9 are laterally stacked to constitute one battery pack. The number of the battery modules M1 to M9 varies according to vehicle models, and nine battery modules M1 to M9 are illustrated in FIG. 1.

For example, as shown in FIG. 2, one battery module may include four cell bundles B1, B2, B3, and B4. Each cell bundle may include two battery cells, and each battery cell has a thin plate-type structure to constitute a pouch-type battery.

Returning to FIG. 1, the inlet duct 101 is disposed above the battery modules M1 to M9 and is connected to an inlet port 102 to forcibly suction cooling air introduced through the inlet port 102. Here, the cooling air may be, for example, indoor air of the vehicle.

The cooling air forcibly suctioned through the inlet duct 101 cools the battery modules M1 to M9 and then passes through the cooling path 103 designed under the battery modules M1 to M9 to move the outlet duct 105.

The cooling air moving to the outlet duct 105 discharges air cooling the battery modules M1 to M9 to a trunk or the outside through the outlet port 111 by a blower 109. In this case, the blower 109 may be, for example, a radial (centrifugal) blower.

As described above, the battery apparatus 100 of the present disclosure has a structure for cooling the battery modules M1 to M9 through a suction cooling method (or a forced convection heat transfer method) using the blower 109.

Meanwhile, in the present disclosure, in order to detect thermal runaway of the battery modules M1 to M9 before occurrence of the thermal runaway of the battery modules M1 to M9, a powder 50, which vaporizes into a gas at a specific temperature lower than a temperature at which thermal runaway occurs, is used.

The powder 50 may be coated on one surface or both surfaces of the battery cell.

As described above, when a cell surface reaches a specific temperature, the powder 50 coated on the surface of the battery cell of each battery module vaporizes into a gas, and the vaporized gas passes through the cooling path 103 designed under the battery modules M1 to M9 and the outlet duct 105 connected to the cooling path 103 together with cooling air to be discharged to the trunk or the outside by the blower 109.

The gas generated from the powder 50 coated on each battery cell is detected by one gas sensor 107. In this case, the gas sensor 107 is installed in the outlet duct 105.

The gas sensor 107 installed in the outlet duct 105 detects the gas generated from the powder 50 and converts a detection result (for example, a concentration value of the gas) into data to transmit the detection result to the BMS 113.

The BMS 113 transmits the detection result received from the gas sensor 107 to the vehicle controller 201 connected to the in-vehicle communication bus 207.

The vehicle controller 201 processes the detection result received from the BMS 113 and transmits the processed detection result to peripheral devices connected to the in-vehicle communication bus 207.

Here, the peripheral devices may include, for example, the display device 203, the communication device 205, and the like.

The display device 203 converts the detection result processed by the vehicle controller 201 into visual information in various forms of text and/or icons indicating a risk of the thermal runaway of the battery modules M1 to M9 and outputs the visual information.

The risk of the thermal runaway may be output as a variety of audio information such as a voice or a sound as well as the visual information. In this case, the vehicle controller 201 may transmit the detection result to an audio output device (not shown in FIG. 1) connected to the in-vehicle communication bus 207.

The driver or the passenger may recognize a degree of risk of the thermal runaway of the battery modules M1 to M9 based on the visual information output by the display device 203 and may take appropriate countermeasures according to the recognition. For example, the driver or the passenger may immediately evacuate the vehicle or immediately terminate the driving of the vehicle.

In addition, the vehicle controller 201 may transmit the detection result received from the BMS 113 to the communication device 205 connected to the in-vehicle communication bus 207.

The communication device 205 may transmit the detection result received from the vehicle controller 201 to a mobile terminal 300 (for example, a smartphone) possessed by the driver or the passenger to warn the vehicle driver or the passenger about the risk of the thermal runaway of the battery modules M1 to M9 in advance.

In order to transmit the detection result to the mobile terminal 300 of the driver or the passenger, the mobile terminal 300 and the communication device 205 may perform wireless communication using short-range wireless communication, for example, Wi-Fi or Bluetooth.

To this end, the communication device 205 may be configured to support a short-range wireless communication function, and since a hardware configuration for supporting the short-range wireless communication function is well known, description thereof will be omitted.

In addition, the communication device 205 may transmit the detection result received from the vehicle controller 201 to the mobile terminal 300 of the driver or the passenger as well as a mobile terminal possessed by a family member or an acquaintance of the driver or the passenger.

The family member or the acquaintance of the driver or the passenger may recognize a risk of thermal runaway of the battery of the vehicle in which the driver or the passenger is present in advance through the mobile terminal thereof to also notify the driver or the passenger of the risk of the thermal runaway of the battery of the vehicle.

In order to transmit the detection result to the mobile terminal of the family member or the acquaintance of the driver or the passenger, the communication device 205 may be configured to support a mobile communication function, for example, a 3G, 4G, or 5G communication function, and since a hardware configuration for supporting such a mobile communication function is well known, description thereof will be omitted.

Although it has been described in the present disclosure that the display device 203 and the communication device 205 receive the detection result of the gas sensor 107 through the vehicle controller 201, the detection result may be received from the BMS 113 without passing through the vehicle controller 201.

As long as the powder 50 coated on the surface of the battery cell to detect the thermal runaway of the battery modules M1 to M9 before occurrence of the thermal runaway is made of a material that vaporizes at a specific temperature, a type of the material is not limited.

For example, the powder 50 may be made of an alumina-based and/or synthetic resin-based material manufactured in a powder form. A composition ratio or content ratio may be easily determined through a plurality of experiments such that the powder 50 vaporizes at the specific temperature.

The specific temperature may be lower than a temperature at which thermal runaway of the battery modules M1 to M9 occurs (for example, about 300° C. at a cell surface) and may be determined to provide sufficient evacuation time to the driver or the passenger.

In the present specification, a temperature at which a gas starts to be generated from the powder 50 is exemplified as about 100° C. described above, but the present disclosure is not limited thereto.

Meanwhile, as shown in FIG. 2, the powder 50 coated on the surface of the battery cell may be coated on a lower area of the surface of the battery cell which is positioned at a lower level than lead terminals 30 (or electrical conductors) provided at both sides of each battery cell included in the battery module, that is, on a lower area of the surface of the battery cell which is adjacent to the cooling path 103.

When the powder 50 is coated on an upper area of the surface of the battery cell, that is, on a position at a higher level than the lead terminal 30 of the battery cell, a gas vaporized from the powder 50 passes through the lead terminal 30 of the battery cell to move downward (toward the cooling path) through a forced suction method. In this case, when the powder 50 is made of a material having conductivity, because the vaporized gas also has conductivity, a short circuit may occur between adjacent lead terminals 30.

When the powder 50 is coated on the lower area of the surface of the battery cell adjacent to the cooling path 103, since a gas generated from the powder 50 immediately moves to the cooling path 103 designed just under the battery cell as soon as the gas is generated, it is possible to fundamentally prevent a phenomenon in which the gas passes through the lead terminal 30.

In order to reduce the possibility of a short circuit with the lead terminal 30, a material of the powder 50 may be a non-conductive material. However, when a coating position of the powder 50 is determined as the lower area of the surface of the battery cell, since the material of the powder 50 may be a conductive material, a degree of freedom in selecting the material of the powder 50 vaporized at a specific temperature is high.

As described above, in the present disclosure, in order to detect thermal runaway of the battery cell in advance before occurrence of the thermal runaway, a specific powder vaporized at a specific temperature is coated on the surface of the battery cell, and when a surface temperature of the cell reaches the specific temperature, the gas sensor installed in the outlet duct detects a gas vaporized from the powder and notifies a driver or a passenger of a detection result. Thus, the driver or the passenger recognizes a risk of the thermal runaway before the occurrence of the thermal runaway of the vehicle battery to evacuate or terminate the driving of the vehicle before the occurrence of the thermal runaway. As a result, it is possible to prevent a deadly accident and vehicle damage due to battery explosion.

Of course, it is also possible to detect thermal runaway of a vehicle battery using a temperature sensor, but in this case, the temperature sensor should be attached to each battery module. Accordingly, an increase in installation cost according to the temperature sensor and an increase in size of the battery module are unavoidable due to lines and connectors connected to the temperature sensor.

However, in the present disclosure, since a gas vaporized from the powder coated on the surface of each cell is detected using one gas sensor 107 to detect thermal runaway of the battery, there is no need to install a plurality of temperature sensors, and since the powder is simply coated on the surface of the cell and one gas sensor 107 is installed in the outlet duct 105, it is possible to implement a system capable of detecting thermal runaway without increasing an overall size of a battery module assembly.

Hereinafter, a method of detecting thermal runaway of a vehicle battery using the vehicle battery apparatus shown in FIG. 1 will be described in detail with reference to FIG. 3.

FIG. 3 is a flowchart illustrating a method of detecting thermal runaway of a vehicle battery according to an embodiment of the present disclosure. In each operation below, content overlapping that described with reference to FIGS. 1 and 2 will be described briefly or omitted.

Referring to FIG. 3, first, in operation 310, the method of detecting thermal runaway of a vehicle battery starts from a situation in which a surface of a battery cell reaches a specific temperature.

In the present disclosure, since thermal runaway of a vehicle battery is detected before occurrence of the thermal runaway, the specific temperature is defined as a temperature lower than a temperature at which thermal runaway of the battery cell occurs (for example, about 300° C.). Although not particularly limited, in order to provide sufficient evacuation time to a driver, the specific temperature may be defined as about 100° C. that is ⅓ of the temperature at which thermal runaway occurs.

Then, when a surface temperature of the battery cell reaches the specific temperature, in operation 320, a gas is generated from a powder 50 coated on the surface of the battery cell. The powder 50 may be coated on one surface or both surfaces of the battery cell.

In this case, as shown in FIG. 2, a coating area of the powder 50 on the entire surface of the battery cell may be a lower area of the surface of the battery cell, and as described above, a reason for coating the powder 50 on the lower area is for reducing the possibility of dielectric breakdown between the gas and a lead terminal.

As an example, the lower area of the surface of the battery cell may be a lowermost area when the surface of the battery cell is vertically divided into three equal areas. In this case, the powder 50 may be laterally coated on the lowermost area.

As another example, the lower area of the surface of the battery cell may be an area of the entire surface of the battery cell, which corresponds to a position at a lower level than the lead terminal 30 of the battery cell.

As still another example, the lower area of the surface of the battery cell may be an area closest to a cooling path designed just under the battery module.

As yet another example, the lower area of the surface of the battery cell may be an area which is positioned at a lower level than the lead terminals 30 provided at both sides of each battery cell and is closest to the cooling path.

Next, in operation 330, the gas generated from the powder 50 moves to the cooling path 103 and then passes through an outlet duct 105 to be discharged to the outside or a trunk through an outlet port 111 by a blower 109.

Then, in operation 340, when the gas generated from the powder 50 is introduced into the outlet duct 105, a gas sensor 107 installed in the outlet duct 105 detects the gas and transmits a gas detection result to a BMS 113.

The gas detection result is used as information for predicting the occurrence of the thermal runaway of the battery cell in advance before the occurrence of the thermal runaway.

The gas detection result detected by the gas sensor 107 may be, for example, bit-type data specifically indicating a concentration value of the gas or may be a flag value in the form of "0" or "1" that simply indicates a gas generation situation rather than a specific concentration value.

For accuracy of detection, the detection result may include the data specifically indicating the concentration value of the gas.

Even when no gas is generated from the powder 50, when cooling air (indoor air in a vehicle) introduced through an inlet duct 101 includes impurities (for example, cigarette smoke), a gas is erroneously detected.

Accordingly, the accuracy of gas detection may be increased through a method of presetting a threshold concentration value and comparing the set threshold concentration value with a concentration value of a gas measured by the gas sensor 107. For example, when a currently measured gas concentration value is greater than or equal to the threshold concentration value, an actual cell surface reaches the specific temperature, and thus it may be detected that a gas is generated from the powder 50.

As another method, the accuracy of detection may be increased through a method of comparing an increase rate of a concentration value of a gas and a threshold increase rate for a preset time. For example, when an increase rate of the concentration value of the gas is greater than or equal to the threshold increase rate, an actual cell surface reaches the specific temperature, and thus, it may be detected that a gas is generated from the powder 50.

A comparison calculation process for the accuracy of detection may be performed by the BMS 113 or a vehicle controller 201.

The BMS 113 or the vehicle controller 201 may perform a data processing process of processing the gas detection result into information indicating the possibility of the thermal runaway of the battery cell based on a result of comparing a preset threshold concentration value with the concentration value of the gas or comparing a preset threshold increase rate with the increase rate of the concentration value of the gas.

Subsequently, in operation 350, the BMS 113 transmits the gas detection result received from the gas sensor 107 to the vehicle controller 201 through an in-vehicle communication bus 207.

Then, in operation 360, the vehicle controller 201 processes the gas detection result received from the BMS 113 to transmit the processed gas detection result to peripheral devices requiring the gas detection result, for example, a display device 203, a communication device 205, an audio output device (not shown), and the like.

A process of processing the gas detection result by the vehicle controller 201 is a data processing process of converting the gas detection result into information such as visual information in the form of text or an icon or information such as audio information, which indicates the possibility of thermal runaway of a battery for each step.

Subsequently, in operation 370, the peripheral device, for example, the display device 203, outputs the gas detection result processed by the vehicle controller 201 in the form of visual information to notify the driver or the passenger of the possibility of the thermal runaway of the vehicle battery.

As another example, when the peripheral device is the audio output device, the audio output device outputs the gas detection result in the form of auditory information.

As still another example, when the peripheral device is the communication device, the communication device 205 forms the gas detection result in a data format based on a previously agreed upon wireless communication protocol and then transmits the gas detection result to a mobile terminal possessed by the driver, a family member of the driver, or an acquaintance of the driver to provide notification of the possibility of the thermal runaway of the vehicle battery.

Although it has been described that the gas detection result detected by the gas sensor 107 is transmitted to the vehicle controller 201, the display device 203, the communication device 205, and the like through the BMS 113 in the above-described method of detecting thermal runaway of a vehicle battery, the gas detection result measured by the gas sensor 107 may be transmitted directly to the vehicle controller 201, the display device 203, the communication device 205, and the like without passing through the BMS 113. In this case, a data processing process of the gas detection result may be performed by a processor installed in each unit.

According to the present disclosure, thermal runaway of a battery cell is detected in advance before occurrence of the thermal runaway and a driver or a passenger is notified thereof to guide the driver to evacuate or terminate the driving of a vehicle, thereby preventing a deadly accident, fire due to battery explosion, and vehicle damage due to the battery explosion.

As such, the embodiments disclosed in the present specification should be considered in an illustrative rather than restrictive sense. The scope of the present disclosure is defined by the appended claims rather than by the foregoing description, and all differences within the scope of equivalents thereof should be construed as being included in the present disclosure.

What is claimed is:

1. A method of detecting thermal runaway of a vehicle battery including a plurality of battery cells, the method comprising:
   when a surface temperature of a surface of a battery cell of the plurality of battery cells reaches a specific temperature, introducing a gas, which is generated from powder coated on the surface of the battery cell, into an outlet duct through a cooling path disposed under the plurality of battery cells;
   transmitting, by a gas sensor installed in the outlet duct, a gas detection result, which is obtained by detecting the gas introduced into the outlet duct, to a vehicle controller;
   processing, by the vehicle controller, the gas detection result into information indicating a possibility of thermal runaway of the battery cell to transmit the processed information to a peripheral device connected to an in-vehicle communication bus; and
   receiving, by the peripheral device, the processed information and outputting the possibility of the thermal runaway of the battery cell as visual information or auditory information.

2. The method of claim 1, wherein the powder includes a synthetic resin or an alumina-based material that vaporizes when the surface temperature of the surface of the battery cell reaches the specific temperature.

3. The method of claim 1, wherein the introducing of the gas into the outlet duct includes forcibly introducing, by a blower installed between the outlet duct and an outlet port, the gas generated from the powder.

4. The method of claim 1, wherein, out of an entire area of the surface of the battery cell, the powder is laterally coated on an area which is positioned at a lower level, in a vertical direction in which the cooling path is disposed under the plurality of battery cells, than lead terminals disposed at both sides of the battery cell and is adjacent to the cooling path.

5. The method of claim 1, wherein the peripheral device includes a display device and an audio output device, and the outputting includes outputting, by the display device, the possibility of the thermal runaway of the battery cell as the visual information, and outputting, by the audio output device, the possibility of the thermal runaway of the battery cell as the auditory information.

6. The method of claim 1, wherein the peripheral device includes a communication device, and the method further includes transmitting, by the communication device, the information processed by the vehicle controller to a mobile terminal.

* * * * *